US006870497B2

(12) United States Patent
Kondo et al.

(10) Patent No.: US 6,870,497 B2
(45) Date of Patent: Mar. 22, 2005

(54) RADIO WAVE ABSORBER AND PRODUCTION METHOD THEREOF

(75) Inventors: Yasuo Kondo, Nagoya (JP); Toru Matsuzaki, Nagoya (JP); Yutaka Suematsu, Nagoya (JP); Masaru Okamoto, Okayama-ken (JP); Tomohisa Yamamoto, Okayama-ken (JP)

(73) Assignees: Kitagawa Industries Co., Ltd., Nagoya (JP); Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 10/911,444

(22) Filed: Aug. 4, 2004

(65) Prior Publication Data

US 2005/0030218 A1 Feb. 10, 2005

(30) Foreign Application Priority Data

Aug. 5, 2003 (JP) ....................................... 2003-287143

(51) Int. Cl.[7] .......................... H01Q 17/00; B05D 5/12; B32B 15/08; B32B 27/00

(52) U.S. Cl. .............................. 342/1; 342/4; 333/81 R

(58) Field of Search ................................ 342/1–12, 22; 442/228, 232, 189; 427/577; 524/442; 264/102; 501/1, 95.1, 95.2, 95.3, 108, 122, 126–132; 428/212–218, 292.1, 293.4, 323, 328, 446, 447, 367; 333/81 R, 81 A, 81 B, 22 R, 22 F

(56) References Cited

U.S. PATENT DOCUMENTS 2,474,384 A * 6/1949 Sunstein ........................ 342/1
4,507,354 A * 3/1985 Ishikawa et al. ............ 442/232
4,726,980 A * 2/1988 Ishikawa et al. ............ 428/212
4,952,935 A * 8/1990 Sawa et al. ..................... 342/4
4,960,633 A * 10/1990 Hiza et al. .................. 428/215
5,003,311 A * 3/1991 Roth et al. ...................... 342/4
5,021,293 A * 6/1991 Huang et al. ............... 428/328
5,094,907 A * 3/1992 Yamamura et al. ......... 428/367
5,113,160 A * 5/1992 Campisi ................... 333/22 R
5,162,133 A * 11/1992 Bartha et al. ............... 427/577
5,310,598 A * 5/1994 Yoshinaka et al. .......... 428/328
5,312,678 A * 5/1994 McCullough, Jr. et al. . 442/189
5,627,541 A * 5/1997 Haley et al. .................... 342/1
5,668,070 A * 9/1997 Hong et al. ................. 501/126
5,770,534 A * 6/1998 Hong ............................ 501/1
6,284,363 B1 * 9/2001 Maeda et al. ............... 428/328
6,521,150 B1 * 2/2003 Maeda et al. ............... 264/102
6,617,038 B2 * 9/2003 Sakurai et al. .............. 428/447
6,716,904 B2 * 4/2004 Takahashi ................... 524/442
6,756,931 B2 * 6/2004 Mukasa et al. ................ 342/1

FOREIGN PATENT DOCUMENTS

JP 3-35840 A 2/1991

* cited by examiner

*Primary Examiner*—Bernarr E. Gregory
(74) *Attorney, Agent, or Firm*—Davis & Bujold, P.L.L.C.

(57) ABSTRACT

A radio wave absorber is provided which can be produced at a low cost compared to the case of using silicon carbide fiber and which is also superior in radio wave absorption property in 76 GHz band (75–77 GHz frequency band). The radio wave absorber is produced by arranging a radio wave absorbing layer onto the surface of a metal body. The radio wave absorbing layer is made of a radio wave absorbing material containing silicon carbide powder dispersed in matrix resin. Average particle diameter of the silicon carbide powder is 4–40 μm. Silicon carbide powder content in the radio wave absorbing material is 15–45 volume %. Thickness of the radio wave absorbing layer is adjusted so that reflection attenuation of not less than 10 dB is provided in 76 GHz band.

5 Claims, 1 Drawing Sheet

RADIO WAVE ABSORBER AND PRODUCTION METHOD THEREOF

Figure 1:
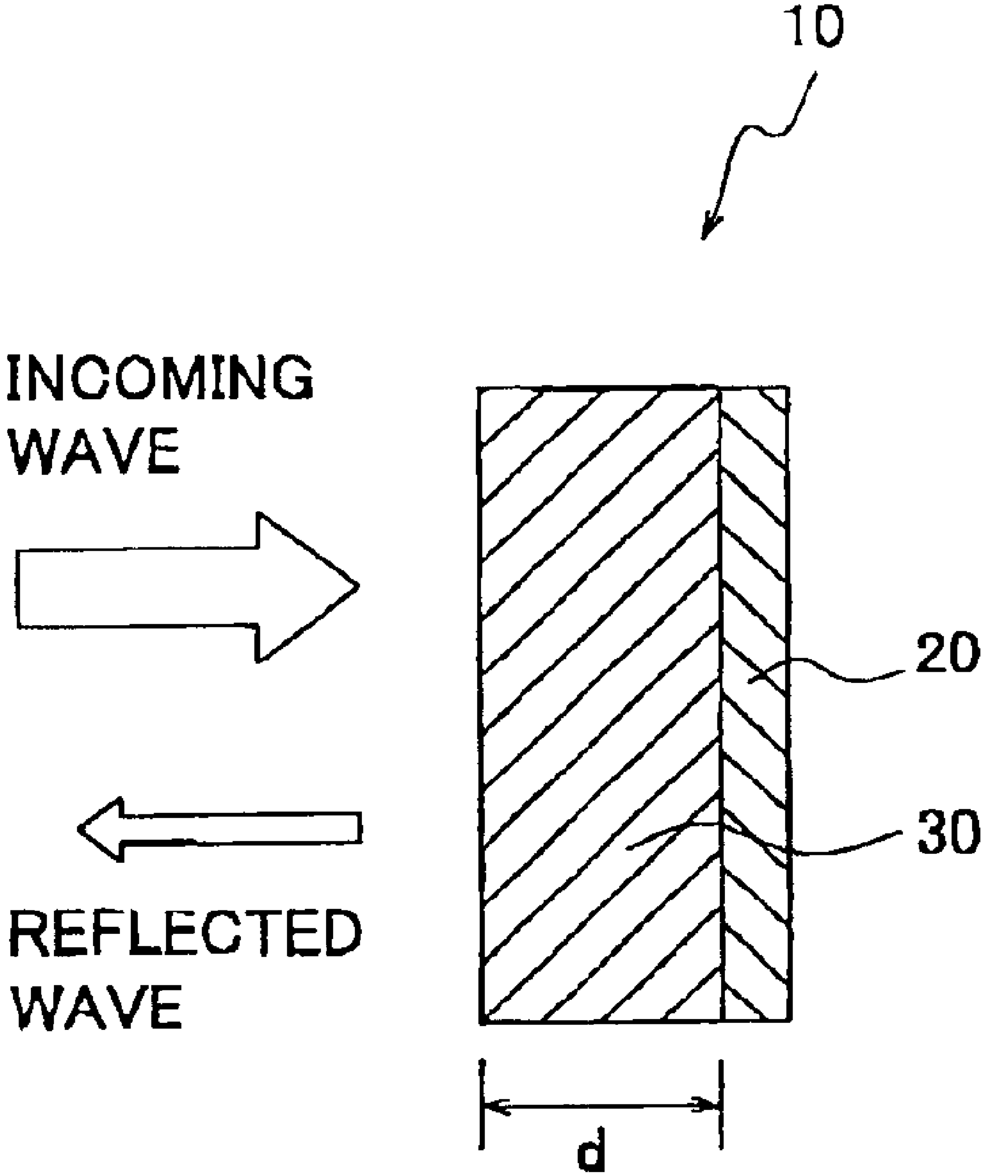

This application claims priority from Japanese patent application serial no. 2003-287143 filed Aug. 5, 2003.

FIELD OF THE INVENTION

This invention relates to a radio wave absorber, more particularly to a radio wave absorber for use in a frequency band (of 75–77 GHz: hereinafter, this frequency band is referred to as 76 GHz band) for automotive radar (specified low power) in Intelligent Transport Systems (ITS).

BACKGROUND OF THE INVENTION

Conventionally, there is a known matching-type radio wave absorber having a laminated structure, in which a radio wave absorbing layer produced from a radio wave absorbing material is arranged on the surface of a radio wave reflection material like a metal plate. In the matching-type radio wave absorber, reflection amounts on both the surface of the radio wave absorbing layer and the surface of the radio wave reflection material, of radio wave entering from the side of the radio wave absorbing layer, are controlled to be balanced out so that the reflection wave can be attenuated.

Also, this kind of matching-type radio wave absorber is known to contain silicon carbide fiber in its radio wave absorbing material. For example, the Examined Japanese Patent Publication No. 3-35840 discloses a radio wave absorbing material which contains silicon carbide fiber having the electric resistance of $10^0$–$10^5$ Ω·cm.

SUMMARY OF THE INVENTION

In ITS, 76 GHz band is to be designated for automotive radar use. Accordingly, through the spread of ITS, demand for radio wave absorbers which is capable of absorbing radio wave of 76 GHz band is expected to increase in future.

However, conventional radio wave absorbers are not capable of sufficient absorption of radio wave of 76 GHz band. Or, even if they can, such absorbers are costly, which are only used for military purpose.

For example, the radio wave absorber disclosed in the aforementioned publication serves for the purpose in 8–16 GHz frequency band. However, in a frequency band not less than 75 GHz, desired radio wave absorption efficiency cannot be achieved. Moreover, silicon carbide fiber is so an expensive material that the use is comparatively limited. Therefore, it is not easy to supply enough raw material for mass production, causing to increase the production cost of the radio wave absorber.

Due to the aforementioned reasons, it is urgently necessary to develop a radio wave absorber that can fully absorb radio wave of 76 GHz band at a cost economically feasible for general consumer use.

One object of the present invention is to provide a radio wave absorber which can be produced at a low cost compared to the conventional case of using silicon carbide fiber, and which is superior in radio wave absorption property in 76 GHz band (75–77 GHz frequency band).

To attain this and other objects, the present invention provides a radio wave absorber having a laminated structure formed by arranging a radio absorbing layer on the surface of a metal body. The radio wave absorbing layer is produced from a radio metal absorbing material containing silicon carbide powder dispersed in matrix resin. An average particle diameter of the silicon carbide powder is 4–40 μm. A content of the silicon carbide powder in the radio absorbing material is 15–45 volume %. The radio absorbing layer has a thickness which allows a reflection attenuation of not less than 10 dB in 75–77 GHz frequency band.

In the above radio wave absorber, the content of silicon carbide powder in the aforementioned radio wave absorber may be 26–45 volume % and the radio wave absorbing layer may have a thickness which allows a reflection attenuation of not less than 20 dB in 75–77 GHz frequency band.

The matrix resin may be ethylene-propylene rubber.

Moreover, in the aforementioned radio wave absorber, the radio wave absorber may have an integrally-molded laminated structure which comprises an adhesive layer and the aforementioned radio wave absorbing layer. The adhesive layer is comprised of a radio wave reflection layer and an adhesive. The radio wave reflection layer corresponds to the metal body which is a metal plate or a metal layer.

A method of producing the above described radio wave absorber comprises the following steps: forming the radio wave absorbing material into a sheet to produce the radio wave absorbing layer; applying an adhesive to one surface side of a radio wave reflection layer which is the metal body and baking the metal body with the adhesive to produce an adhesion layer; arranging the adhesive layer on the radio wave absorbing layer in such a manner that the surface side with the adhesive faces the radio wave absorbing layer, heating and applying pressure to these layers to constitute an integrally-molded structure.

In the previously described radio wave absorber, the radio wave absorbing material which constitutes the radio absorbing layer comprises silicon carbide powder dispersed in matrix resin. The average particle diameter of the silicon carbide powder is 4–40 μm. Such silicon carbide powder has been used as abrasive and produced in large quantities. Accordingly, the powder is comparatively easy to obtain and inexpensive compared to silicon carbide fiber which is used for a very limited specific purpose, for example. Therefore, the material can be easily supplied even when the radio wave absorber becomes commercially produced. Such a radio wave absorber is also cost-effective.

Moreover, in the present invention, the content of silicon carbide powder in the radio wave absorbing material is 15–45 volume % and the radio absorbing layer has a thickness which provides a reflection attenuation of not less than 10 dB in 75–77 GHz frequency band. Therefore, the radio wave absorber of the present invention is an extremely promising absorber for 76 GHz band to be used in automotive radar in ITS. Furthermore, since the radio wave absorber can be designed sufficiently thin, it can be easily fitted in a compact apparatus.

In order to achieve the reflection attenuation of not less than 10 dB in 76 GHz band (75–77 GHz frequency band), it is important that both the average particle diameter of the above silicone carbide powder and the content of silicon carbide powder in the radio wave absorbing material satisfy the previously described numerical ranges and further, the thickness of the radio wave absorbing layer is adjusted in such a manner that the reflection attenuation of not less than 10 dB can be achieved. This is a fact obtained by inventors of the present invention through statistical processing of numerous experiments.

If one of the followings, that is, the average particle diameter of silicon carbide powder, the content of silicon carbide powder in the radio wave absorbing material, and the thickness of the radio wave absorbing layer, does not comply with the previously mentioned numerical range, the radio wave absorber which provides the reflection attenuation of not less than 10 dB in 76 GHz band (75–77 GHz frequency band) may not be obtained.

More particularly, for example, even if the content of silicon carbide powder is 15–45 volume % and the average particle diameter of silicon carbide powder is 4–40 μm, the radio wave absorber which provides the desired reflection attenuation cannot necessarily achieved. The thickness of the radio wave absorbing layer must be adjusted in such a manner that the reflection attenuation of not less than 10 dB is indicated. In addition, even if the reflection attenuation of not less than 10 dB is obtained as a result of the appropriate adjustment of the thickness of the radio wave absorbing layer within the certain numerical range, the thickness may have to be changed according to a modification in either of the content of silicon carbide powder in the radio absorbing material or the average particle diameter of silicon carbide powder. Furthermore, when the content of silicon carbide powder in the radio wave absorbing material is 15–45 volume % but the average particle diameter of silicon carbide powder is not within a range of 4–40 μm, or when the average particle diameter of silicon carbide powder is 4–40 μm but the content of silicon carbide powder in the radio wave absorbing material is not within a range of 15–45 volume %, the radio wave absorber which provides a desired reflection attenuation may not be obtained regardless of how the thickness of the radio wave absorbing layer is adjusted.

In short, the previously described average particle diameter of silicon carbide powder, content of silicon carbide powder of the radio wave absorbing material, and thickness of the radio wave absorbing layer, are inseparably-related parameters which interact with each other.

The radio wave absorber of the present invention can provide a reflection attenuation of not less than 20 dB in 76 GHz band by narrowing down its properties as previously described.

That is, if the content of silicon carbide powder in the radio wave absorbing material is 26–46 volume % and the radio wave absorbing layer has a thickness that allows a reflection attenuation of not less than 20 dB in 76 GHz band, the radio wave absorber which is much superior in radio wave absorption property can be obtained.

The matrix resin can be any synthetic resin material that is adapted for having silicon carbide powder mixed or dispersed therein. Above all, ethylene-propylene rubber (EPDM; ethylene propylene diene monomer terpolymer) is ideal for the matrix resin, since the rubber has sufficient strength even when the radio wave absorbing layer is formed extremely thin (0.3–2.5 mm, for example). Furthermore, processability of the ethylene-propylene rubber is good in forming the radio wave absorbing layer. Ethylene-propylene rubber can be replaced with CPE (chlorinated polyethylene), TPE (thermoplastic elastomer), liquid silicone, silicone rubber, and urethane rubber, for example.

Moreover, it is preferable that the radio wave absorber in the present invention has an integrally-molded laminated structure comprising an adhesive layer and the radio wave absorbing layer. The adhesive layer is comprised of a radio wave reflection layer and an adhesive. The radio wave reflection layer corresponds to the metal body which is a metal plate or a metal layer.

The radio wave absorber constituted as above can exert desired radio wave absorption efficiency only by setting it, even in a location where no metal body exists. Because the radio wave absorber is provided with both the radio wave reflection layer and the radio wave absorbing layer. Moreover, the thickness of the radio wave absorbing layer can be optimized in advance, taking into account the thickness of the adhesive layer. Therefore, the radio wave absorption efficiency of the radio wave absorber hardly fluctuates compared to the case in which the adhesive is applied onto the radio wave reflection layer on the spot to adhere the radio wave reflection layer to the radio wave absorbing layer. As a result, higher radio wave absorbing efficiency can be easily attained.

The aforementioned radio wave absorber can be produced in the following steps. Firstly, the radio wave absorbing material is formed into a sheet to produce a radio wave absorbing layer. An adhesive is applied to the surface of the metal body as a radio wave reflection layer. Baking is performed to the radio wave reflection layer to produce an adhesive layer. The adhesive layer is disposed on the radio wave absorbing layer in such a manner that the surface side with the adhesive faces the radio wave absorbing layer. Then, the layers are heated and pressure is applied to constitute an integrally-molded structure.

The metal body which constitutes a laminated structure together with the radio wave absorbing layer can be a metal plate or a metal layer, as previously mentioned, which is specifically provided as a component of the radio wave absorber. However, if a metal member (for example, metal case or panel) is present at a location where the radio wave absorbing layer is to be arranged, the radio wave absorbing layer can be provided on that metal member, thus constituting a radio wave absorber together with the metal member.

Additionally, the radio wave absorber is disposed in such a manner that the radio wave absorbing layer faces the side of incoming radio wave and the metal body faces the opposite side of the radio wave absorbing layer. However, in case that radio wave enters from both sides of the radio wave absorber, two radio wave absorbing layers can be provided on both sides of one metal body.

BRIEF DESCRIPTION OF THE DRAWING FIGURES

The invention will now be described, by way of example, with reference to the accompanying drawing, in which:

A single FIGURE is a schematic view of a radio wave absorber according to a an embodiment of the present invention.

BEST MODE FOR CARRYING OUT THE INVENTION

Now, an embodiment of the present invention is described below.

(1) Production of Radio Wave Absorber (1.1) Preparation of Material

Ethylene-propylene rubber (Mitsui Chemicals, Inc.; Product name: Mitsui EPT) and silicon carbide powder (Showa Denko K.K.; GREENDENSIC) are mixed and kneaded by a pressure kneader or an open roll. Then, in the process of improving dispersibility of silicon carbide powder using the open roll, the mixture is formed into a sheet of a prescribed size.

(1.2) Application of Adhesive

Phenol adhesive (preferably, novolac type) is applied by spraying or dipping onto a SUS (stainless used steel) plate which is cut into a prescribed shape to form a first layer. It is preferable that the surface of the SUS plate is made uneven beforehand by acid treatment, for the purpose of improving the adhesiveness. After that, the SUS plate is dried for 0.5–5 min. at room temperature and then baked for 5–15 min. at 150–200° C. Subsequently, a primer (silane coupling agent) is applied onto the first layer to form a second layer. Baking is further performed in the same manner as the first layer is treated. It is preferable that the baking for the second layer is performed at 130–180° C. As above, the SUS plate is double-coated by the adhesives.

(1.3) Molding

The rubber material formed into a sheet in (1.1) is cut into a piece which is a little smaller than the SUS plate. The piece is disposed on the metal plate on which the adhesive has been applied. The metal plate with the rubber material is put into a mold and integrally press-molded (vulcanized) for 3–7 min. at 170–190° C.

As shown in FIG. 1, following the aforementioned steps (1.1) to (1.3), a radio wave absorber 10 having a laminated structure composed of a radio wave reflection layer 20 of SUS and a radio wave absorbing layer 30 of ethylene-propylene rubber containing silicon carbide powder was obtained.

(2) Measurement of Radio Wave Absorption Efficiency

In order to study radio wave absorption efficiency of the above radio wave absorber 10, a plurality of samples different in: average particle diameter of silicon carbide powder, content of silicon carbide powder in the radio absorbing material, and thickness (shown as "d" in FIG. 1) of the radio absorbing layer 30, were produced. Then, the radio wave absorption efficiency of the respective samples was measured.

In the measurement, radio wave of 75–77 GHz frequency band was applied to the samples using an HVS Free Space Microwave Measurement System (HVS Technologies, Inc.), and the reflection attenuation was measured.

Evaluation of the radio wave absorber 10 was conducted based on the reflection attenuation amount indicating the absorption efficiency. Particularly, the sample is given: (1) grade "◎" if the attenuation amount is not less than 20 dB, (2) grade "○" if the attenuation amount is not less than 10 dB but less than 20 dB, (3) grade "Δ" if the attenuation amount is not less than 5 dB but less than 10 dB, and (4) the grade "X" if the attenuation amount is less than 5 dB.

The results of the measurement and evaluation are shown in Tables 1 and 2 below.

TABLE 1

| No. | Diameter of SiC powder ($\mu$m) | Content of SiC powder (vol %) | Thickness (d) of absorbing layer (mm) | Attenuation (dB) | Grade |
|---|---|---|---|---|---|
| 1 | 4 | 26 | 1.3 | 5.8 | Δ |
| 2 | | | 1.2 | 27.9 | ◎ |
| 3 | | | 1.1 | 14.2 | ○ |
| 4 | | | 1.0 | 4.9 | X |
| 5 | | 28 | 1.2 | 5.2 | Δ |
| 6 | | | 1.1 | 11.1 | ○ |
| 7 | | | 1.0 | 20.8 | ◎ |
| 8 | | 30 | 1.2 | 5.0 | Δ |
| 9 | | | 1.0 | 14.0 | ○ |
| 10 | | | 0.9 | 4.9 | X |
| 11 | 11 | 26 | 1.3 | 5.7 | Δ |
| 12 | | | 1.2 | 22.3 | ◎ |
| 13 | | | 1.0 | 3.9 | X |
| 14 | | 28 | 1.2 | 6.1 | Δ |
| 15 | | | 1.1 | 34.3 | ◎ |
| 16 | | | 1.0 | 8.5 | Δ |
| 17 | | | 0.9 | 3.1 | X |
| 18 | | 30 | 1.3 | 3.4 | X |
| 19 | | | 1.2 | 6.8 | Δ |
| 20 | | | 1.0 | 22.8 | ◎ |

TABLE 1-continued

| No. | Diameter of SiC powder ($\mu$m) | Content of SiC powder (vol %) | Thickness (d) of absorbing layer (mm) | Attenuation (dB) | Grade |
|---|---|---|---|---|---|
| 21 | | | 0.9 | 4.1 | X |
| 22 | 22 | 26 | 1.3 | 4.7 | X |
| 23 | | | 1.2 | 18.8 | ○ |
| 24 | | | 1.1 | 22.2 | ◎ |
| 25 | | | 1.0 | 4.4 | X |
| 26 | | 28 | 1.3 | 4.2 | X |
| 27 | | | 1.2 | 13.5 | ○ |
| 28 | | | 1.1 | 30.2 | ◎ |
| 29 | | | 1.0 | 5.8 | Δ |
| 30 | | | 0.9 | 2.5 | X |
| 31 | | 30 | 1.3 | 3.6 | X |
| 32 | | | 1.2 | 8.7 | Δ |
| 33 | | | 1.1 | 32.4 | ◎ |
| 34 | | | 1.0 | 9.0 | Δ |
| 35 | | | 0.9 | 3.2 | X |

TABLE 2

| No. | Diameter of SiC powder ($\mu$m) | Content of SiC powder (vol %) | Thickness (d) of absorbing layer (mm) | Attenuation (dB) | Grade |
|---|---|---|---|---|---|
| 36 | 40 | 15 | 3.0 | 4.4 | X |
| 37 | | | 2.7 | 6.6 | Δ |
| 38 | | | 2.5 | 21.0 | ◎ |
| 39 | | | 2.4 | 13.1 | ○ |
| 40 | | | 2.3 | 7.0 | Δ |
| 41 | | | 2.0 | 3.0 | X |
| 42 | | | 1.5 | 10.2 | ○ |
| 43 | | 20 | 2.0 | 6.6 | Δ |
| 44 | | | 1.6 | 3.7 | X |
| 45 | | | 1.4 | 9.1 | Δ |
| 46 | | | 1.8 | 16.0 | ○ |
| 47 | | | 1.1 | 3.3 | X |
| 48 | | 26 | 2.0 | 12.0 | ○ |
| 49 | | | 1.5 | 4.2 | X |
| 50 | | | 1.3 | 13.6 | ○ |
| 51 | | | 1.2 | 12.9 | ○ |
| 52 | | | 1.1 | 5.0 | Δ |
| 53 | | | 1.0 | 2.6 | X |
| 54 | | 28 | 2.0 | 15.5 | ○ |
| 55 | | | 1.8 | 8.5 | Δ |
| 56 | | | 1.2 | 26.0 | ◎ |
| 57 | | | 1.1 | 7.4 | Δ |
| 58 | | | 1.0 | 3.2 | X |
| 59 | | 30 | 1.4 | 4.4 | X |
| 60 | | | 1.2 | 24.4 | ◎ |
| 61 | | | 1.1 | 11.3 | ○ |
| 62 | | 40 | 1.0 | 7.1 | Δ |
| 63 | | | 0.9 | 10.5 | ○ |
| 64 | | | 0.8 | 4.9 | X |
| 65 | | | 0.4 | 5.2 | Δ |
| 66 | | | 0.3 | 12.6 | ○ |
| 67 | | 45 | 1.0 | 4.9 | X |
| 68 | | | 0.9 | 8.5 | Δ |
| 69 | | | 0.8 | 6.9 | Δ |
| 70 | | | 0.4 | 4.2 | X |
| 71 | | | 0.3 | 17.6 | ○ |
| 72 | | | 0.2 | 4.7 | X |

In the above tables, let us take a look at the samples with grades "◎" and "○". It is found that, under conditions where the average particle diameter of silicon carbide powder is 4–40 $\mu$m and the content of silicon carbide powder is 15–45 volume %, and further if the thickness of the radio wave absorbing layer 30 is adjusted within a range of 0.3–2.5 mm, the radio wave absorbing layer 30 can be adjusted to provide a reflection attenuation of not less than 10 dB in 76 GHz band (75–77 GHz frequency band).

Also, referring to the samples with grade "◎", it is found that, under conditions where the average particle diameter of silicon carbide powder is 4–40 μm and the content of silicon carbide powder is 26–45 volume %, and further if the thickness of the radio wave absorbing layer 30 is adjusted within a range of 0.3–1.2 mm, the radio wave absorbing layer 30 can be adjusted to provide a reflection attenuation of not less than 20 dB in 76 GHz (75–77 GHz) band.

In view of the above, it is concluded that the samples with grades "◎" and "○", especially with grade "◎", can effectively attenuate the reflection wave of incoming radio wave of 76 GHz (75–77 GHz) band.

Accordingly, the radio wave absorber 10 of the present invention is significantly ideal for use in automotive radar for 76 GHz band in ITS. Since the thickness falls within 0.3–2.5 mm, the radio wave absorber 10 can be easily fitted in a compact apparatus.

Furthermore, silicon carbide powder contained in the radio wave absorbing layer 30 of the radio wave absorbing material is commonly used as abrasive which has the average particle diameter of about 4–40 μm. Therefore, the powder is comparatively easy to obtain and inexpensive compared to silicon carbide fiber which is used for only a limited purpose. Accordingly, steady supply of the material is ensured even if the radio wave absorber 10 becomes industrially produced. The cost performance is also improved.

The present invention is not limited to the above embodiment, and other modifications and variations are possible within the scope of the present invention.

What is claimed is:

1. A radio wave absorber of a laminated structure formed by arranging a radio absorbing layer on the surface of a metal body, the radio wave absorbing layer being produced from a radio metal absorbing material containing silicon carbide powder dispersed in matrix resin, wherein an average particle diameter of the silicon carbide powder is 4–40 μm, a content of the silicon carbide powder in the radio absorbing material is 15–45 volume %, and the radio absorbing layer has a thickness which allows a reflection attenuation of not less than 10 dB in 75–77 GHz frequency band.

2. The radio wave absorber according to claim 1, wherein the content of the silicon carbide powder in the radio absorbing material is 26–45 volume %, and the radio absorbing layer has a thickness which allows a reflection attenuation of not less than 20 dB in 75–77 GHz frequency band.

3. The radio wave absorber according to claim 1, wherein said matrix resin is ethylene-propylene rubber.

4. The radio wave absorber according to claim 1, wherein the radio wave absorber has an integrally-molded laminated structure comprising an adhesive layer and said radio wave absorbing layer, the adhesive layer being comprised of a radio wave reflection layer and an adhesive, the radio wave reflection layer being said metal body which is a metal plate or a metal layer.

5. A method of producing the radio wave absorber according to claim 4, the method comprising the steps of:

forming the radio wave absorbing material into a sheet to produce a radio wave absorbing layer, applying an adhesive to the surface of a radio wave reflection layer which is the metal body and baking the metal body with the adhesive to produce an adhesive layer, arranging the adhesive layer on the radio wave absorbing layer in such a manner that the surface side with the adhesive faces the radio wave absorbing layer, heating and applying pressure to these layers to constitute an integrally-molded structure.

* * * * *